United States Patent
Gwosdek et al.

(10) Patent No.: US 11,787,259 B2
(45) Date of Patent: Oct. 17, 2023

(54) HEATING, VENTILATION AND/OR AIR-CONDITIONING DEVICE

(71) Applicant: VALEO KLIMASYSTEME GMBH, Bad Rodach (DE)

(72) Inventors: Albert Gwosdek, Bad Rodach (DE); Wolfgang Hopf, Bad Rodach (DE); Guido Mueller, Bad Rodach (DE); Andreas Schulz, Bad Rodach (DE); Ales Vlachynsky, Prague (CZ)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 528 days.

(21) Appl. No.: 16/762,285

(22) PCT Filed: Nov. 27, 2018

(86) PCT No.: PCT/EP2018/082698
§ 371 (c)(1),
(2) Date: May 7, 2020

(87) PCT Pub. No.: WO2019/105930
PCT Pub. Date: Jun. 6, 2019

(65) Prior Publication Data
US 2020/0353788 A1    Nov. 12, 2020

(30) Foreign Application Priority Data

Nov. 28, 2017  (DE) ..................... 10 2017 128 168.1

(51) Int. Cl.
*B60H 1/00* (2006.01)

(52) U.S. Cl.
CPC ..... *B60H 1/00064* (2013.01); *B60H 1/00321* (2013.01); *B60H 1/00521* (2013.01);
(Continued)

(58) Field of Classification Search
CPC ............ B60H 1/00064; B60H 1/00321; B60H 1/00521; B60H 1/00564; B60H 2001/00092; B60H 2001/00114
(Continued)

(56) References Cited

U.S. PATENT DOCUMENTS

| | | | | | |
|---|---|---|---|---|---|
| 5,988,263 | A | * | 11/1999 | Schwarz | B60H 1/0005 165/41 |
| 6,368,207 | B1 | * | 4/2002 | McLaughlin | B60H 1/0005 454/261 |
| 7,572,178 | B2 | * | 8/2009 | Fuhrmann | B60H 1/00528 454/142 |
| 8,403,029 | B2 | * | 3/2013 | Nanaumi | B60H 1/00028 165/41 |

(Continued)

FOREIGN PATENT DOCUMENTS

| | | |
|---|---|---|
| DE | 19654776 A1 | 7/1998 |
| EP | 2489533 A1 | 8/2012 |

(Continued)

OTHER PUBLICATIONS

International Search Report and Written Opinion in corresponding International Application No. PCT/EP2018/082698, dated Feb. 21, 2019 (11 pages).

*Primary Examiner* — Tho V Duong
*Assistant Examiner* — Raheena R Malik
(74) *Attorney, Agent, or Firm* — Osha Bergman Watanabe & Burton LLP

(57) ABSTRACT

The invention relates to a heating, ventilation and/or air-conditioning device (10) for a motor vehicle, which device comprises a housing (26), a cold air region (84), a hot air region (86), an evaporator (36) which is configured to provide a cold air stream (50) in the cold air region (84), and a heating element (34) which is configured to provide a hot air stream (48) in the hot air region (86). Furthermore, the device (10) has a one-piece cross-flow deflection device (38), which is covered by the housing (26) and comprises a mixing device (40) and a cover (42), wherein the mixing device (40) has a plurality of mixing chambers (52), each of (Continued)

which is provided for mixing a part of the cold air stream (50) and a part of the hot air stream (48). The cover (42) here separates the cold air region (84) and the hot air region (86) from each other at least in portions. Furthermore, the cover (42) has a fixing device (74) which is provided for fixing the heating element (34).

10 Claims, 4 Drawing Sheets

(52) U.S. Cl.
CPC ............... *B60H 1/00564* (2013.01); *B60H 2001/00092* (2013.01); *B60H 2001/00114* (2013.01)

(58) Field of Classification Search
USPC .............................................. 454/69; 165/42
See application file for complete search history.

(56) References Cited

U.S. PATENT DOCUMENTS

| | | | |
|---|---|---|---|
| 9,193,244 B2* | 11/2015 | Stang | B60H 1/00 |
| 2006/0201174 A1* | 9/2006 | Marshall | F24F 13/081 |
| | | | 62/186 |
| 2012/0252342 A1* | 10/2012 | Stang | B60H 1/00 |
| | | | 454/126 |
| 2018/0156228 A1* | 6/2018 | Hancock | F04D 29/281 |
| 2020/0055368 A1* | 2/2020 | Shimoyama | B60H 1/00528 |
| 2020/0079174 A1* | 3/2020 | Laux | B60H 1/00328 |

FOREIGN PATENT DOCUMENTS

| | | | |
|---|---|---|---|
| EP | 1595726 B2 | 10/2012 | |
| EP | 2610092 A1 | 7/2013 | |
| JP | 2004161142 A | 6/2004 | |
| WO | 2016166957 A1 | 10/2016 | |
| WO | WO-2016166957 A1 * | 10/2016 | ......... B60H 1/00064 |

* cited by examiner

HEATING, VENTILATION AND/OR AIR-CONDITIONING DEVICE

The invention relates to a heating, ventilation and/or air-conditioning device for a motor vehicle, which device comprises a housing, a cold air region, a hot air region, a fan, an evaporator which is configured to provide a cold air stream in the cold air region, and a heating element which is configured to provide a hot air stream in the hot air region.

Heating, ventilation and/or air conditioning systems (HVACs) individually control the air flow and temperature to the different climate zones of the passenger compartment, in particular to the foot and body regions, to the windscreen and towards the driver or passenger, and should reliably create a pleasant interior climate.

HVACs known from the prior art comprise a fan, an evaporator, a heating element and a housing with a complex air guidance system with flaps and air-conducting guide faces in the form of a mixer device which is provided to mix hot and cold air, and to conduct the air stream to the different climate zones of the passenger compartment. The housing is usually a plastic injection molding and therefore produced in several pieces for manufacturing reasons.

For space reasons, it is sometimes necessary to accommodate the heating element in the housing such that it extends from one housing half into another housing half. Such a HVAC housing is known for example from EP 1 595 726 B2. Here, each housing half comprises a partition wall portion, wherein in mounted state of the housing, the partition wall portions form a continuous partition wall which separates a cold air region from a hot air region. In order to guarantee a secure connection of the housing halves or partition wall portions, the contact regions of the housing halves or partition wall portions have tongue and groove elements for connecting together.

For manufacturing reasons however, it is not always possible to provide corresponding connecting elements and hence ensure a tight connection of the housing halves. Furthermore, in housing halves with connecting elements, there is a non-negligible risk that on assembly, the connecting elements do not mutually engage correctly and thus the housing halves are not connected together as intended. This may lead to leakage flows between the cold and hot air regions, and to disruptive noises which detract from comfort.

The object of the invention is to provide an improved HVAC which guarantees a secure separation of the hot and cold air regions.

To achieve this object, a heating, ventilation and/or air-conditioning device (referred to below as "device") is provided for a motor vehicle, which device comprises a housing, a cold air region, a hot air region and a fan. The device furthermore comprises an evaporator which is configured to provide a cold air stream in the cold air region, and a heating element which is configured to provide a hot air stream in the hot air region. Furthermore, the device comprises a one-piece cross-flow deflection device which is covered by the housing and has a mixing device and a cover. The mixing device has a plurality of mixing chambers which each serve to mix a part of the cold air stream and a part of the hot air stream. The mixed air is conducted from the mixing chambers to different regions of the vehicle. Furthermore, the cover separates the cold air region and the hot air region from each other at least in portions. The heating element is part of the hot air region. Also, the cover has a first fixing device which is provided for fixing the heating element. Since the cross-flow deflection device and hence the cover are made of one piece, the hot air region is effectively and securely separated from the cold air region, and in this way leakage flows are excluded which could occur with multi-piece cross-flow deflection devices or covers in which the wall portions are not tightly joined together. A further advantage of the device is the fixing device which is provided on the cover for fixing the heating element. This directly fixes the heating element to the cross-flow deflection device, so that the number of transitions between the different components is reduced and hence there are fewer joints between the hot air region and cold air region which must be tightly sealed. Also, the device may in this way be configured particularly compactly.

In one embodiment, the cover has an elongated form. Also, the housing is divided into a first and a second housing half in a plane transversely to the longitudinal extension of the cover. Because the housing is not made of one piece, the housing can be produced more easily and hence more cheaply.

The cover may extend in the longitudinal direction from one respective housing half into the other housing half. Thus the cover extends over the contact region in which the first and second housing halves are connected together or abut each other.

It may be provided that the cross-flow deflection device is configured such that, in operation of the device, the cold air stream flows along the cover, in particular transversely to the longitudinal direction of the cover and/or on the side of the cover which is arranged opposite the first fixing device. In this way, the cover may furthermore be provided to conduct the cold air stream, whereby for example separate guidance elements may be omitted.

In a further embodiment, the cover has a receiving space for a heating element extending in the longitudinal direction. In particular, the first fixing device is provided in the receiving space. This means that the heating element extends along the cover and at least in portions is received in the receiving space and preferably fixed in the receiving space.

Furthermore, a first longitudinal edge of the heating element may be fixed to the cross-flow deflection device by means of the first fixing device. In a heating element with a rectangular base surface, the longitudinal edge is the edge which extends along one of the long sides. Thus the heating element may be fastened particularly well, in particular if the fixing device extends over a substantial part of the corresponding longitudinal edge.

The heating element may be laterally inserted in the first fixing device for fixing to the cross-flow deflection device, whereby simple and secure mounting can be guaranteed.

According to one embodiment, the housing has a second fixing device for fixing the heating element, wherein a second longitudinal edge of the heating element, opposite the first longitudinal edge, is fixed to the housing by means of the second fixing device. In this way, the heating element is attached by one of its long sides to the cross-flow deflection device and by the opposite long side to the housing. Thus the heating element is fastened securely and stably.

According to a further embodiment, the second fixing device is configured such that the heating element can be laterally inserted in the second fixing device for fixing to the housing. This may ensure that the heating element can be mounted simply and securely.

The cross-flow deflection device may be an injection molding, whereby it can be produced at low cost.

Further advantages and features arise from the following description in conjunction with the attached drawings. In these drawings:

FIG. 1 shows an air-conditioning device 10 (device) for a motor vehicle, which in this case is a car. Alternatively, the device 10 may be provided for any other vehicles, such as trucks or utility vehicles.

Figure 2:
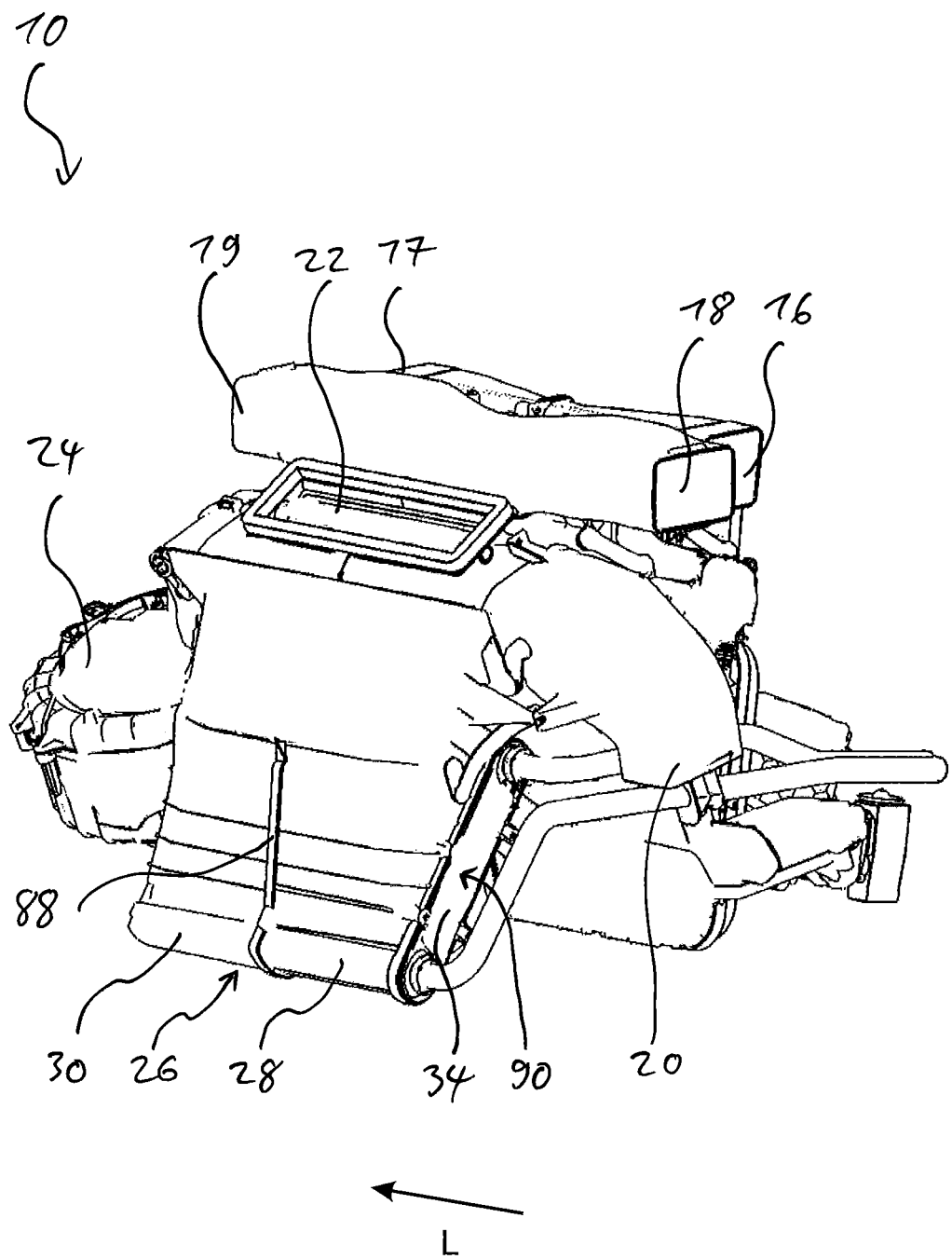
FIG. 2 shows a perspective view of the device from FIG. 1.

The device 10 has an air inlet 12 through which air can flow into the device 10, and an air outlet 14 for the windscreen, two air outlets 16, 17 for the side windows, two air outlets 18, 19 for the side regions, an air outlet 20 for the foot region, and an air outlet 22 for the frontal region (see FIG. 2), through which air can flow into the corresponding regions of the passenger compartment of the motor vehicle.

A fan 24 is provided in order to propel the air inside the device 10 and in this way create an air flow from the air inlet 12 to the air outlets 14-22.

Figure 3:
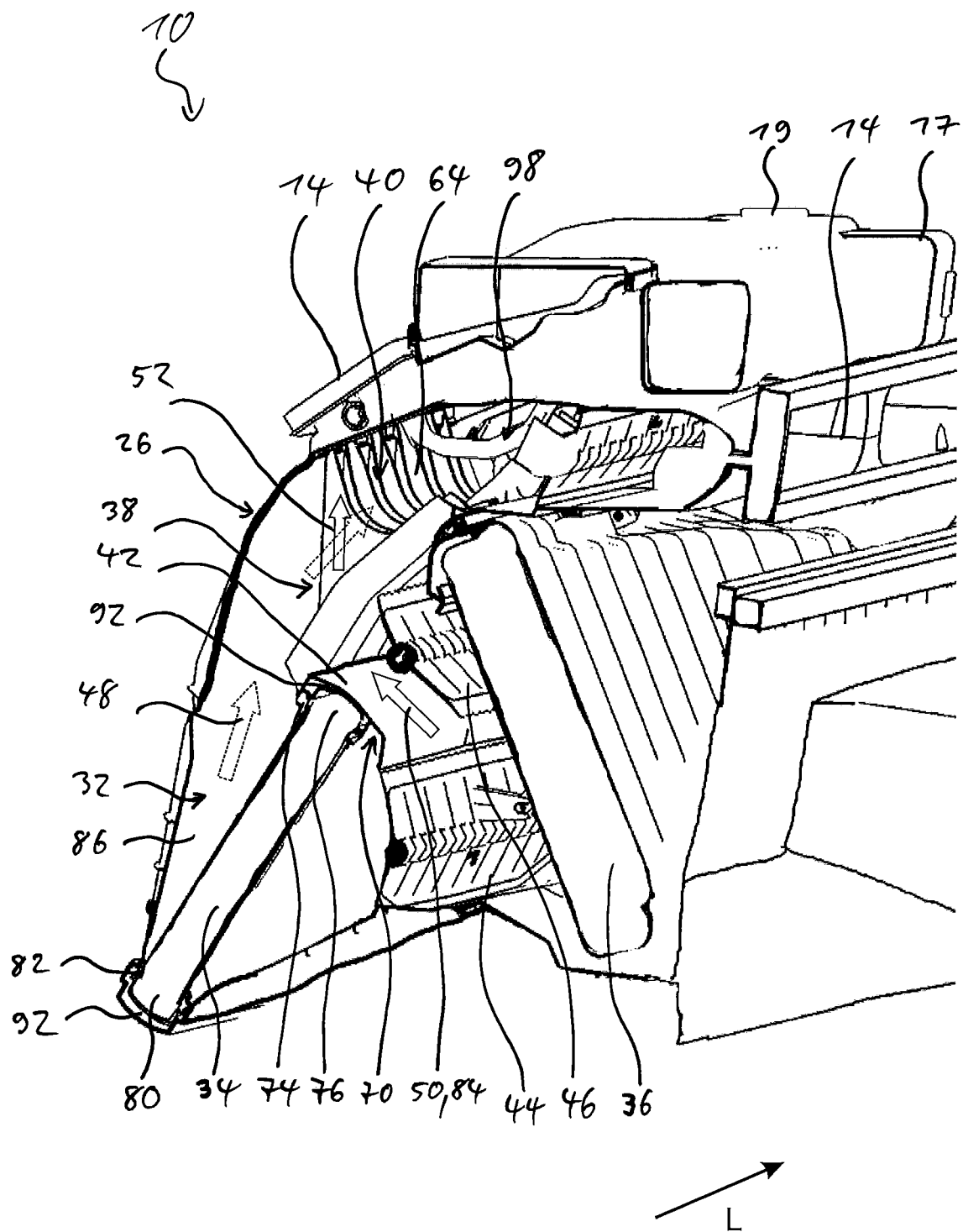
FIG. 3 shows a diagrammatic sectional view of the device from FIG. 1 with a cross-flow deflection device.

Furthermore, the device 10 has a housing 26 with a first housing half 28 and a second housing half 30 (the housing division runs in a vertical plane in the vehicle longitudinal direction) which together form a chamber 32 of the device 10 (see FIG. 3). The chamber 32 contains a heating element 34, an evaporator 36, a cross-flow deflection device 38 with a mixing device 40 and a cover 42, and a first air guidance flap 44 and a second air guidance flap 46.

The heating element 34 provides a hot air stream 48 in that an air stream flowing through the heating element 34 is heated. The evaporator 36 provides a cold air stream 50 in that an air stream flowing through the evaporator 36 is cooled.

The cross-flow deflection device 38 is a one-piece injection molding.

Figure 4:
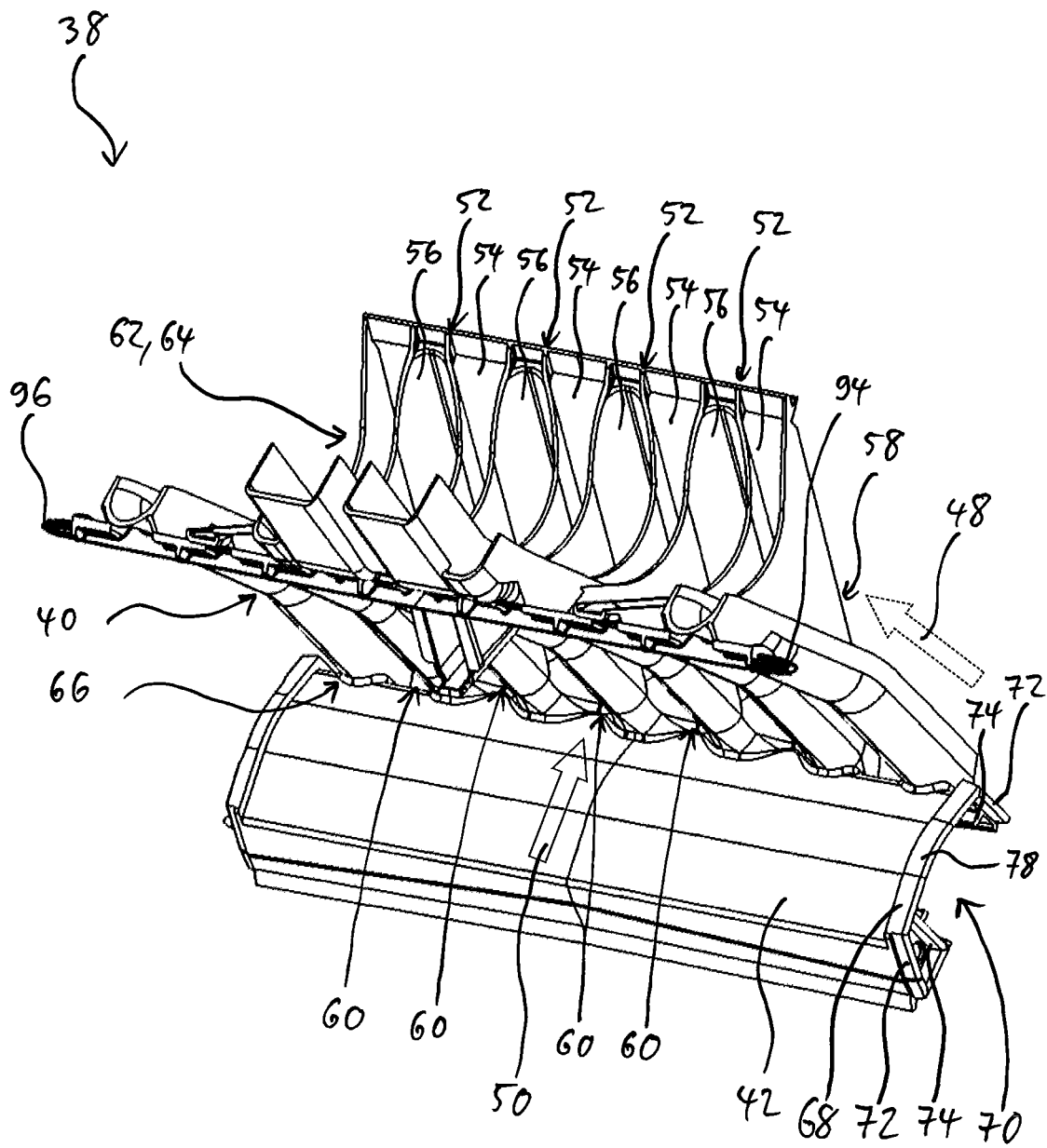
FIG. 4 shows a perspective view of the cross-flow deflection device from FIG. 3.

The mixing device 40 of the cross-flow deflection device 38 (see FIG. 4) has a comb-like structure and comprises a plurality of mixing chambers 52 which are arranged next to each other in a longitudinal direction L and are each formed by a hot air chamber 54 and a cold air chamber 56. Each hot air chamber 54 has an inlet in the form of a hot air opening 58 through which part of the hot air stream 48 can flow into the hot air chamber 54, and each cold air chamber 56 has an inlet in the form of a cold air opening 60 through which a part of the cold air stream 50 can flow into the cold air chamber 56. The hot air openings 58 and the cold air openings 60 are not shown in FIG. 4, so the positions of the openings 58, 60 are indicated by the arrows of the reference signs, wherein because of the perspective, only one of the hot air openings 58 is indicated.

The mixing chambers 52 are provided to mix the hot air and cold air, flowing into the mixing chambers 52 through the respective hot air opening 58 and cold air opening 60, into an air stream with a defined temperature. Via the geometry of the mixing chambers 52, in particular the size of the hot air opening 58 and the cold air opening 60, the mixing ratio of hot air to cold air, and hence the resulting temperature of the air stream of the corresponding mixing chamber 52, can be set.

On the top side 62 of the mixing device 40, each mixing chamber 52 has an outlet 64 which is arranged downstream of the corresponding hot air opening 58 and cold air opening 60, and via which the mixed air stream is conducted to the corresponding air outlets 14-22.

On the underside 66 of the mixing device 40 opposite the top side 62, the cover 42 extends in the longitudinal direction L transversely over the entire mixing device 40.

The cover 42 has a U-shaped profile 68, forming a receiving space 70 in the cover 42 which extends in the longitudinal direction L and is open towards the bottom, i.e. opposite the mixing device 40. The receiving space 70 is provided for partially receiving the heating element 34.

On the inside of the legs 72 of the U-shape, the cover 42 has a first fixing device 74 by means of which a first longitudinal edge 76 of the heating element 34, which extends in the longitudinal direction L, is fastened to the cross-flow deflection device 38 (see FIG. 3). In addition or alternatively, in an alternative embodiment, the first fixing device 74 may be provided at another point on the cover 42, for example only on one leg 72, on the base 78 of the U-shape (see FIG. 4), and/or outside the receiving space 70.

The second longitudinal edge 80 of the heating element 34, which is arranged opposite the first longitudinal edge 76 and extends parallel thereto in the longitudinal direction L, is fixed by means of a second fixing device 82 which is formed in the housing 26 opposite the first fixing device 74.

The second fixing device 82 is configured similarly to the first fixing device 74. Alternatively, the first fixing device 74 and the second fixing device 82 may be configured differently from each other.

The heating element 34, the mixing device 40 and the cover 42 of the cross-flow deflection device 38 each extend completely through the chamber 32 in the longitudinal direction L. In this way, the heating element 32 and the cross-flow deflection device 38 divide the chamber 32 into a cold air region 84 in which the evaporator 36 is arranged, and a hot air region 86 which is arranged on the opposite side between the housing 26 and the cross-flow deflection device 38. The heating element 34 which separates the cold air region 84 from the hot air region 86 here belongs to the hot air region 86 because of the increased temperature of the air stream inside the heating element 34.

Figure 1:
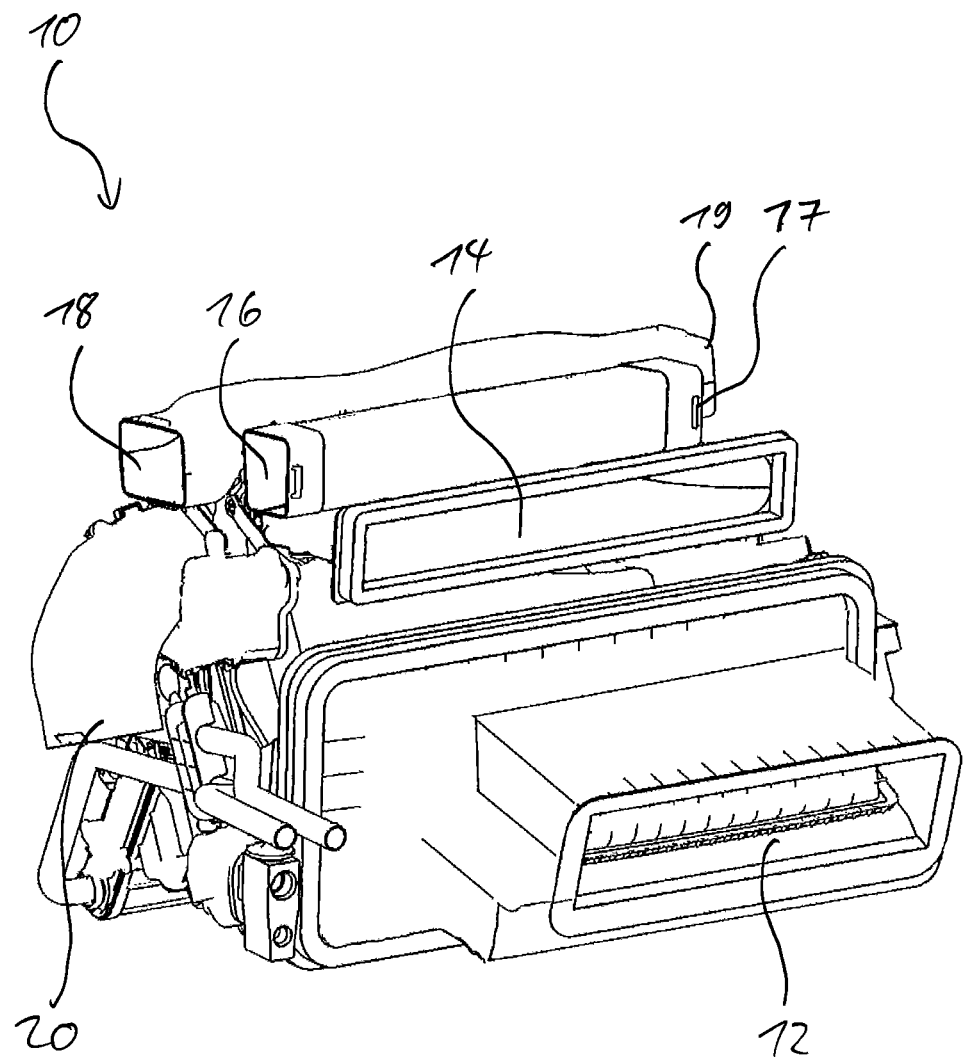
FIG. 1 shows a perspective frontal view of a heating, ventilation and/or air-conditioning device according to the invention.

The housing 26 is divided centrally and vertically to the longitudinal direction L into two housing halves 28, 30 (see FIG. 1), whereby the heating element 34 and the cross-flow deflection device 38 each extend in the longitudinal direction L from one housing half 28, 30 into the other housing half 28, 30. In an alternative embodiment, the housing 26 may be divided transversely to the longitudinal direction L, i.e. at an angle of between 0° and 90° to the longitudinal direction L. In a further alternative embodiment, the abutment edge 88 at which the first housing half 28 adjoins the second housing half 30 may not run straight and/or may not be arranged centrally.

The fixing devices 74, 82 are configured such that for mounting, the heating element 34 may be laterally inserted in the housing 26 in the longitudinal direction L. In this way, the heating element 34 is inserted in the fixing devices 74, 82 and thus held by the housing 26 and by the cover 42.

To insert the heating element 34, the first housing half 28 has a corresponding opening 90 (see FIG. 1) which, when the heating element 34 is mounted, is closed air-tightly by the heating element 34. For this, the opening 90 may for example comprise a sealing element.

The heating element 34 may furthermore be extracted from the housing 26 against the longitudinal direction L.

The fixing devices 74, 82 each form a labyrinth seal which ensures that no air can flow through the gap 92 between the heating element 34 and the cover 42, or between the heating element 34 and the housing 26, from the cold air region 84 into the hot air region 86 or vice versa. In addition or alternatively, a separate sealing device may be provided, in particular in the receiving space 70, which guarantees that the heating element 34 is connected air-tightly to the cover 42 and housing 26.

Furthermore, a first alignment device 94 and a second alignment device 96 are arranged at the axial ends of the mixing device 40; these devices each take the form of a pin extending in the longitudinal direction L and serve to orient the cross-flow deflection device 38 relative to the housing 26. For this, the first alignment device 94 is connected to the first housing half 28, and the second alignment device 96 is connected to the second housing half 30, in each case by form fit. In this way, simple and secure mounting is guaranteed.

In an alternative embodiment, further alignment devices 94, 96 may be provided for alignment or fixing of the cross-flow deflection device 38 in the housing 26. Alternatively or additionally, the alignment devices 94, 96 may be configured arbitrarily, and/or arranged arbitrarily on the cross-flow deflection device 38.

Furthermore, sealing devices may be provided on the axial ends of the cross-flow deflection device 38 and/or the axial ends of the heating element 34, in order to seal the cross-flow deflection device 38 or heating element 34 against the housing 26, so as to ensure that the cold air region 84 and the hot air region 86 are separated from each other also at the axial ends of the cross-flow deflection device 38 or heating element 34.

In operation of the device 10, air flows from the air inlet 12 through the evaporator 36 into the cold air region 84 (see FIG. 3). The air guidance flaps 44, 46 set the proportion of the air stream which is conducted through the heating element 34 and then forms the hot air stream 48 which flows to the mixing device 40 in the hot air region 86. The other part of the air stream flows as a cold air stream 50 along the mixing device 40 transversely to the longitudinal direction L and opposite the receiving space 70 on the cover 42. Via the hot air openings 58 and cold air openings 60, the hot air stream 48 and the cold air stream 50 flow into the corresponding mixing chambers 52 in which the hot and cold air flows are mixed to form an air stream with the predefined temperature.

In the embodiment shown in FIG. 3, the outlets 64 of the mixing chambers 52 end in a common mixing region 98 which is fluidically coupled to all outlets 14-22. This means that the air in the mixing chamber 52 is mixed in the mixed air region 98 and can flow out via all air outlets 14-22.

In an alternative embodiment, individual or several mixing chambers 52 may be fluidically directly connected to one or more of the air outlets 14-22. In particular, each mixing chamber 52 may be fluidically directly connected to an air outlet 14-22, so that the air mixed in a mixing chamber 52 is intended for a specific air outlet 14-22 and hence a specific vehicle region.

According to a further embodiment, one or more further air guidance flaps may be provided for conducting the air streams 48, 50 in the chamber 32. In particular, these may be provided upstream of the hot air openings 58 and/or cold air openings 60 of the mixing device 40, in order to be able to set the mixing ratio of the corresponding mixing chambers 52 and hence the temperature of the air which is provided at the outlet 64 of the corresponding mixing chamber 52.

The one-piece structure of the cross-flow deflection device 38, which extends in the longitudinal direction L over the abutment edge 88 of the two housing halves 28, 30, ensures that leakage flows between the cold air region 84 and hot air region 86 through the cross-flow deflection device 38 are suppressed. In particular, the cover 42, which extends seamlessly through the chamber 32 in the longitudinal direction L and divides the cold air region 84 and hot air region 86 from each other at least in portions, guarantees that no leakage flows can occur between the cold air region 84 and the hot air region 86, as is the case with comparable air-conditioning devices in which the cover 42 is configured in the form of a multipiece partition wall and/or as part of the housing 26.

In this way, an air-conditioning device 10 is provided which guarantees a secure separation of the cold air region 84 and hot air region 86, and hence offers greater comfort because of a more precise temperature setting and less disruptive noise. Furthermore, the proposed air-conditioning device 10 can be produced economically and be mounted easily and safely.

The invention is not restricted to the embodiments shown. In particular, individual features of one embodiment may be contained in a further embodiment according to the invention, independently of the other features of the corresponding embodiment, i.e. the features described may be combined arbitrarily.

The invention claimed is:

1. A heating, ventilation and/or air-conditioning device for a motor vehicle, the device comprising:
    a housing;
    a cold air region;
    a hot air region;
    a fan;
    an evaporator configured to provide a cold air stream in the cold air region;
    a heater configured to provide a hot air stream in the hot air region; and
    a one-piece cross-flow deflection device, which is covered by the housing and comprises a mixing device and a cover,
    wherein the mixing device has a plurality of mixing chambers arranged in a comb-like structure comprising alternating cold air chambers and hot air chambers, each mixing chamber comprises a corresponding cold air chamber and a corresponding hot air chamber next to each other in the comb-like structure for mixing a part of the cold air stream flowing through the corresponding cold air chamber and a part of the hot air stream flowing through the corresponding hot air chamber,
    wherein the cover separates the cold air region and the hot air region from each other at least in portions, and wherein the cover is adapted to mount the heater.

2. The device as claimed in claim 1, wherein the cover has an elongated form and that the housing is divided into a first and a second housing half in a plane transversely to the longitudinal extension of the cover.

3. The device as claimed in claim 2, wherein the cover extends in a longitudinal direction from one respective housing half into the other housing half.

4. The device as claimed in claim 1, wherein the cross-flow deflection device is configured such that the cold air stream flows along the cover transversely to the longitudinal direction of the cover and/or on the side of the cover which is arranged opposite a first fixing device forming a first labyrinth seal for mounting the heater.

5. The device as claimed in claim 1,
wherein the cover has a U-shaped profile forming a receiving space for the heater in the longitudinal direction, wherein a first fixing device forming a first labyrinth seal for mounting the heater is provided in the receiving space, and
wherein the comb-like structure of the mixing device and the U-shaped profile of the cover are integrally formed as a single piece.

6. The device as claimed in claim 1, wherein a first longitudinal edge of the heater is fixed to the cross-flow deflection device by a first fixing device forming a first labyrinth seal for mounting the heater.

7. The device as claimed in claim 6, wherein the first fixing device is configured such that the heater is laterally inserted in the first fixing device for fixing to the cross-flow deflection device.

8. The device as claimed in claim 1, wherein the housing has a second fixing device forming a second labyrinth seal for fixing the heater, wherein a second longitudinal edge of the heater is fixed to the housing by the second fixing device.

9. The device as claimed in claim 8, wherein the second fixing device is configured such that the heater is laterally inserted in the second fixing device for fixing to the housing.

10. The device as claimed in claim 1, wherein the cross-flow deflection device is an injection molding.

* * * * *